United States Patent
Cornils et al.

(10) Patent No.: US 6,719,351 B2
(45) Date of Patent: *Apr. 13, 2004

(54) WINDOW WITH A PROFILED BEAD COMPRISING A COVERING ATTACHMENT

(75) Inventors: Gerd Cornils, Merzenich-Girbelsrath (DE); Florian Fischer, Aachen (DE); Frank Bihn, Huckelhoven (DE); Ulrich Behrend, Eschweiler (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/036,447

(22) Filed: Jan. 7, 2002

(65) Prior Publication Data

US 2002/0153743 A1 Oct. 24, 2002

Related U.S. Application Data

(63) Continuation of application No. 09/555,025, filed as application No. PCT/FR99/02260 on Sep. 23, 1999, now Pat. No. 6,332,640.

(30) Foreign Application Priority Data

Sep. 24, 1998 (DE) .......................... 198 43 843

(51) Int. Cl.[7] ................................. B60J 1/02
(52) U.S. Cl. ................. 296/93; 296/96.21; 296/146.15; 52/204
(58) Field of Search ............... 296/93, 96.21, 296/146.14, 146.15; 52/204; 49/377, 441, 490.1

(56) References Cited

U.S. PATENT DOCUMENTS

| | | | | |
|---|---|---|---|---|
| 4,458,459 A | * | 7/1984 | Irrgang | 52/204.597 |
| 4,532,741 A | * | 8/1985 | Knudel | 296/93 |
| 4,768,319 A | * | 9/1988 | Derner | 52/204.591 |
| 4,933,032 A | | 6/1990 | Kunert | |
| 5,005,317 A | * | 4/1991 | Saint-Louis Augustin et al. | 49/377 |
| 5,107,646 A | | 4/1992 | Tamura | |
| 5,114,206 A | | 5/1992 | Yada | |

(List continued on next page.)

FOREIGN PATENT DOCUMENTS

| | | |
|---|---|---|
| DE | 3818930 | 12/1989 |
| DE | 4039552 | 6/1992 |
| DE | 4301026 | 7/1994 |
| EP | 0 611 672 A2 | 8/1994 |
| JP | 4-87831 | 3/1992 |
| JP | 5-330336 | 12/1993 |
| JP | 5-338438 | 12/1993 |
| JP | 6-127268 | 5/1994 |

*Primary Examiner*—Kiran Patel
(74) *Attorney, Agent, or Firm*—Oblon, Spivak, McClelland, Maier & Neustadt, P.C.

(57) ABSTRACT

In a window (1), which is intended in particular to be fitted in a bodywork opening (11) of a vehicle, which is equipped on at least a main surface, intended to face inwards in the fitted state, with a profiled bead (2) which comprises, as lateral covering attachment, a lip (5) projecting beyond the edge of the pane (1) with a sealing rib (7) which can be applied against an adjacent wall part (13) when the window is fitted, there is provided on the lip (5), according to the invention, parallel to the first sealing rib (6) which can be applied against the wall part (13), at least one second sealing rib (7) which can be applied against the edge (21) of the window without adhesion contact.

In this way, a covering of the lateral space is obtained effecting in practice a closure flush with the main surface of the pane and with the adjacent wall or bodywork surface.

13 Claims, 1 Drawing Sheet

U.S. PATENT DOCUMENTS

| | | | |
|---|---|---|---|
| 5,154,471 A | * 10/1992 | Mimura et al. | 296/93 |
| 5,199,760 A | * 4/1993 | Vering | 296/146.16 |
| 5,273,338 A | 12/1993 | Gooding et al. | |
| 5,519,979 A | 5/1996 | Kunert et al. | |
| 5,527,083 A | 6/1996 | Kreye | |
| 5,555,685 A | 9/1996 | Watanabe et al. | |
| 5,558,387 A | 9/1996 | Sumida et al. | |
| 5,561,954 A | 10/1996 | Watanabe et al. | |
| 5,567,239 A | 10/1996 | Ribic, Jr. | |
| 5,601,329 A | * 2/1997 | Glagow et al. | 296/146.14 |
| 5,603,546 A | 2/1997 | Desir, Sr. | 296/93 |
| 5,723,196 A | 3/1998 | Cornils et al. | |
| 5,743,047 A | * 4/1998 | Bonne et al. | 49/441 |
| 5,803,527 A | * 9/1998 | Fujiya | 296/146.15 |
| 5,806,257 A | 9/1998 | Cornils et al. | |
| 5,840,401 A | * 11/1998 | Baesecke | 49/490.1 |
| 5,897,937 A | * 4/1999 | Cornils et al. | 156/242 |
| 5,988,730 A | 11/1999 | Bekaert | |
| 6,089,646 A | 7/2000 | Xu et al. | |
| 6,106,047 A | * 8/2000 | Nagahashi et al. | 296/93 |
| 6,134,851 A | 10/2000 | Roze et al. | |
| 6,240,676 B1 | * 6/2001 | Cornils et al. | 49/324 |
| 6,332,640 B1 | * 12/2001 | Cornils et al. | 296/146.15 |

\* cited by examiner

US 6,719,351 B2

WINDOW WITH A PROFILED BEAD COMPRISING A COVERING ATTACHMENT

This is a continuation of application Ser. No. 09/555,025 filed on Feb. 12, 2000 which is a 371 of PCT/FR99/02260 filed Sep. 23, 1999 now U.S. Pat. No. 6,332,640.

BACKGROUND OF THE INVENTION

The invention relates to the field of windows, especially for motor vehicles, and more particularly concerns windows which are equipped with decorative and/or functional elements attached to the glass. It more especially concerns a window, in particular for fitting into the bodywork opening of a vehicle, comprising a pane with a profiled bead which is fixed at least on the main surface of the pane facing inwards in the fitted state, and which comprises, as covering attachment, a lip which projects beyond the edge of the pane with a sealing rib which can be applied against an adjacent wall part when the window is fitted.

It is known in general to adhesively bond the windows of vehicles in the respective openings of the bodywork of the vehicle. To do this, the panes are often provided with a profiled bead which adheres at least on their main surface facing inwards in the fitted state. On the profiled bead and/or in proximity thereto, a strip of adhesive is applied on this same main surface. The pane provided with the strip of adhesive is then inserted into the opening. The latter is framed by a mounting flange, on which the strip of adhesive is applied. The windows in the fitted state must preferably be situated practically flush with the external surface of the bodywork. To do this, the mounting flange is set back with respect to the main surface of the bodywork by means of a peripheral angled ledge. The height of the angled ledge corresponds to the thickness of the window and of the adhesive. In certain designs, the edges of the panes are not covered by the profiled bead. As the dimensions of the pane and the perimeter of the opening cannot be adapted to one another without tolerance, because of the size variations upon manufacture, a space is left in the form of a groove between the angled ledge or the edge of the opening and the pane.

According to document DE-A1-38 18 930, in order to cover this space, a lip is provided which is formed directly on the profiled bead adhering to the pane, preferably by extrusion. In another alternative embodiment in the same document, a supplementary profiled band of a flexible elastomeric plastic is adhesively bonded, along the peripheral surface of the pane, on the main surface facing inwards. This supplementary profiled band has a tubular portion which fills the said space when the window is in the fitted state.

A profiled shape is also known (DE-A1-43 01 026) which encloses on three sides the external edge and the edge of the pane in one embodiment, that is to say also on the external main surface, and which additionally comprises a lip projecting from the pane and serving as a lateral slot covering.

Thermoplastic materials, preferably thermoplastic elastomers (TPE) or thermoplastic olefins (TPO), have principally been used hitherto as materials for such profiles. With these, the lip can be manufactured to be sufficiently thin as early as at the extrusion stage, so as to be able to flex elastically against the edge of the opening upon fitting of the window in the bodywork, without generating excessively high forces of reaction during fitting. In addition to its sealing function, the lip centres the window in the opening during insertion and keeps the window centred.

Dirt can still accumulate in the space thus covered by the folded-up lip and can only be removed with difficulty from the bottom of the groove.

SUMMARY OF THE INVENTION

The object of the invention is to make available a window with a profiled bead comprising a covering attachment, so that the covering of the space between the edge of the pane and the adjacent wall part is further improved.

In this regard, the invention relates to a window which is intended in particular to be fitted in a bodywork opening of a vehicle, which is equipped at least on a main surface, intended to face inwards in the fitted state, with a profiled bead which comprises, as lateral covering attachment, a lip projecting beyond the edge of the pane with a sealing rib which can be applied against an adjacent wall part when the window is fitted, in which there is provided on the lip, parallel to the first sealing rib which can be applied against the wall part, at least one second sealing rib which can be applied against the edge of the window without adhesion contact.

By "edge of the window" we mean either the edge of the pane itself or, if the profiled bead is covering the latter, the corresponding bead portion.

In this way, it is possible to obtain, without having to use separate sealing profiles, a covering of the lateral space effecting advantageously a closure flush with the main surface of the pane and with the adjacent wall or bodywork surface. In addition to the technical advantages, a visibly closed surface is thereby obtained.

The characteristics of the secondary claims indicate advantageous refinements of this subject matter.

Manipulation of the pane during fitting is greatly facilitated, according to advantageous refinements, if the profiled bead is formed on the window in such a way that the second sealing rib is applied or extends already freely against or in proximity to the edge of the window after the profiled bead has been fixed on the pane, and/or the lip has, on its longitudinal extension between a base profile of the profiled bead fixed to the pane and the sealing ribs, a point of flexion of greatly reduced cross section.

Other characteristics and advantages of the subject matter of the invention will be evident from the drawings of an illustrative embodiment and from the following description thereof.

DETAILED DESCRIPTION OF THE INVENTION

Figure 1:
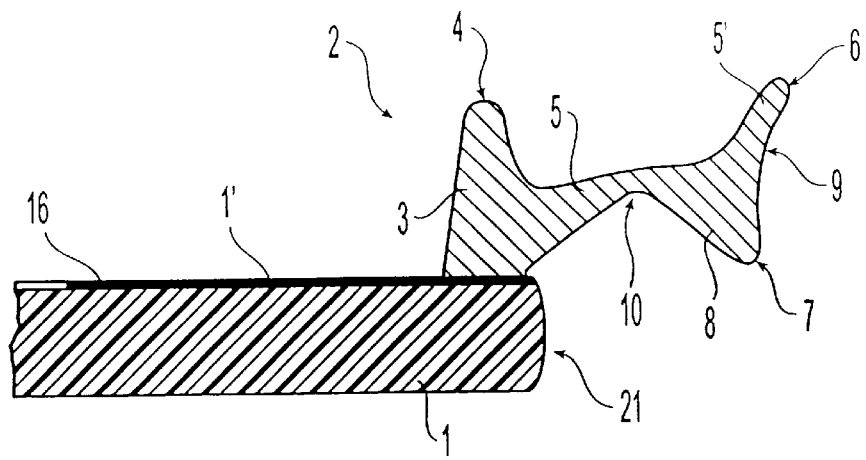
FIG. 1 shows diagrammatically a cross section of the peripheral zone of a pane with a profiled bead adhering thereto, which comprises a lip provided with two sealing ribs projecting at its free ends in opposite directions.

According to FIG. 1, a pane 1 is provided, in a manner known per se, with a profiled bead 2 adhering near its edge on one of its main surfaces. This can be placed, in a manner also known per se, directly on the surface of the pane 1 or, as illustrated here, on a coating 1' improving adhesion, preferably by extrusion or by another process such as overmoulding or encapsulation, adhesive bonding of a prefabricated bead, etc. It is made preferably of a thermoplastic material, preferably an elastomer, or mixture of thermoplastic elastomers (TPE) or thermoplastic olefin(s) (TPO).

The pane 1 can be made of glass or of a transparent elastic and can be of monolithic design or, differing from the illustration, with a laminated structure combining at least two sheets of glass and/or transparent plastic.

The profiled bead 2 essentially comprises a base profile 3 bearing on a main surface of the pane. This profile projects approximately at right angles from the surface of the pane 1 and forms, at its free end, a support rib 4. The latter is located, in the fitted position, against a mounting flange of a bodywork opening and defines the vertical position of the pane 1 (cf. FIG. 2).

In the embodiment shown, the profiled bead 2 adheres only on the main surface of the pane intended to be directed inwards. As an alternative, it can cover two or three faces of the pane, namely a main surface and at least part of the edge of the pane, or respectively the two main surfaces and the edge of the pane by straddling the edge of the latter.

A lip 5 formed in one place projects from the base profile 3 at a certain angle relative to the main extension of the latter, if appropriate approximately parallel to the main surface of the pane, about half way between the pane 1 and the support rib 4, and extends beyond the contour of the pane. At its end situated opposite the base profile 3, the lip 5 has an elastically flexible continuation 5' which projects at a certain angle from the lip. Its free end forms a first sealing rib 6 (external) which extends away from the pane. A second sealing rib 7 (internal) is also formed on the lip 5 situated opposite the external sealing rib 6. The two sealing ribs 6 and 7 are connected to the lip 5 by way of a thickened area or bulge of material 8. They extend along the longitudinal extension of the profiled bead 2 parallel to one another. On the side of the profiled bead 2 oriented away from the lip 5, the two sealing ribs 6, 7 are connected to one another via a surface 9 which is flat or, as is illustrated here, slightly curved, preferably towards the interior of the vehicle.

Overall, the bulge of material 8 presents, in conjunction with the sealing ribs 6 and 7 and the surface 9, a cross section which is almost triangular, if appropriate asymmetrical, one point of which joins the lip 5 and the other two points of which are formed by the sealing ribs 6 and 7.

The lip 5, in this configuration, no longer has a direct sealing or covering function, even though it is located in the space to be covered. Instead, it serves as an elastically deformable support wing for the continuation 5', as well as the sealing ribs 6 and 7. Its cross section can therefore remain very thin (for example 0.8 mm). In the embodiment illustrated here, it has in fact, at the centre of its longitudinal extension between the base profile 3 and the bulge of material 8, a particularly small or narrow cross section. The latter constitutes a point of flexion 10 in the manner of a flat hinge.

Between the edge 21 of the window, that is to say the edge of the pane 1 itself, or where appropriate the portion of the profiled bead 2 covering the edge of the pane, and the internal sealing rib 7, there must be no adhesion contact. In order to guarantee this, upon extrusion of the profiled bead a space is first retained between the internal sealing rib 7 (oriented towards the pane) and the edge of the pane. This space can then be reduced by internal prestressing, under the effect of the intrinsic weight immediately after the extrusion of the profiled bead, or by a separate process of shaping. The thermoplastic profiled beads can, in a known manner, also be post-formed plastically by heating. A slight free elastic bearing of the internal sealing rib 7 against the edge 21 of the pane can be advantageous upon fitting because the rib is thereby protected against folding during the insertion of the pane and the unstressed lip does not protrude too far past the edge of the pane.

Figure 2:
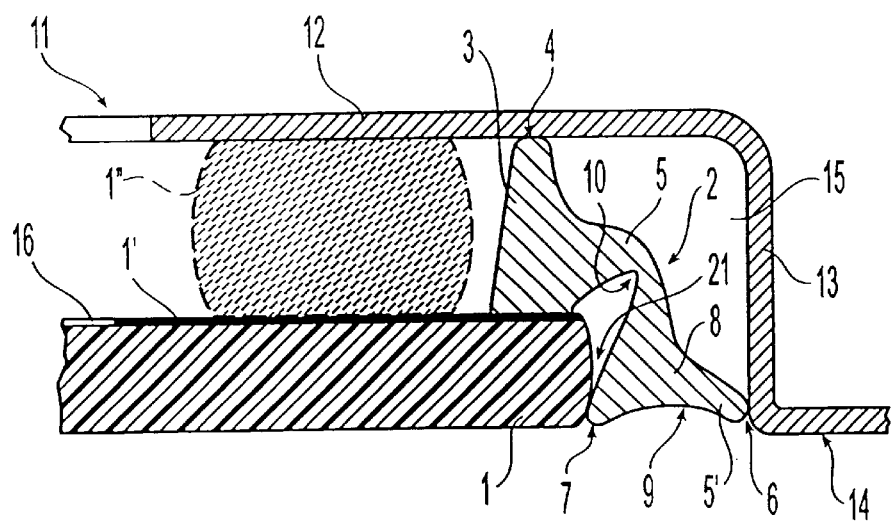
FIG. 2 shows diagrammatically a cross section, in the fitted state, of the window illustrated in FIG. 1.

FIG. 2 better illustrates the technical and visual benefit of this embodiment of the profiled bead. This figure shows, in addition to the window 1 and the profiled bead 2, also the edge of an opening 11 of a bodywork (not shown in further detail). A mounting flange 12 encloses the opening. It is slightly set back in relation to the external surface of the bodywork 14 connected to it, by means of a ledge 13 which forms the wall part adjacent to the window 1. As has already been mentioned, the window 1 is applied on the mounting flange by means of the support rib 4 of the base profile 3. In this mounted state, the external main surface of the pane is practically flush with the external surface of the bodywork.

The pane 1 is connected by adhesion to the mounting flange 12 in a known manner, by means of a strip of adhesive 1" applied alongside and parallel to the profiled bead 2 on the opaque coating 1', and shown here only by a broken line. The support rib 4 in this case serves as a spacer even for a defined thickness of the bead of adhesive.

At the latest during this fitting operation, the lip 5 is strongly curved, the function of the point of flexion 10 being clearly demonstrated here. The space 15 in the form of a groove in which the lip is fitted can be clearly seen. The external sealing rib 6 bears against the ledge 13, the internal sealing rib 7 bears against the edge 21 of the pane 1, on each edge as near as possible to the external main face. The elastic deformation of the continuation 5' ensures the necessary pressure force of the two sealing ribs 6 and 7. Together with the face 9, these form a covering attachment for the space 15, which bears almost flush with the external surface of the bodywork, and this without having to use a supplementary sealing profile. Compared to the previous lip designs, a particularly reduced residual space is obtained here between the pane and the opening, so that it is possible to avoid not only dirtk, but also aerodynamic noise.

However, the design of the lip and of the sealing ribs requires that very particular consideration be given to the conditions at the edges, so as to be able to obtain a functional mounting and to exclude, during the subsequent use of the vehicle, practically all damage and/or loss of functionality.

With fitting the window 1 in the opening 11 against the mounting flange 12, initially the continuation 5' or the external sealing rib 6 passes first against the ledge 13, or against the edge in the transition from the external surface of the bodywork 14 to the ledge 13. If one continues to push the pane 1—which thus compresses the strip of adhesive 1" applied beforehand—the contact between the sealing rib 6 and the ledge 13 causes the lip 5 to flex still further. The internal sealing rib 7 then arrives in contact with the edge 21 of the pane 1.

The continuation 5' of the lip 5 is also designed in a lip shape with a small cross section. As a continuation of the lip 5, it must in particular be designed with a length and an elasticity which are sufficient to allow it to reliably absorb all the admissible dimensional variations in the reciprocal sizes of the pane and of the opening and to allow the support rib 6 to bear reliably against the adjacent wall part, such as the ledge 13.

By contrast, the internal sealing rib 7 is the point of the compact bulge of material 8, which is itself essentially more rigid than the lip 5 and its continuation 5'. By adding sufficient material in the transitions between the lip 5 and the sealing ribs, it is possible to guarantee that none of the sealing ribs 6, 7 folds back inwards during fitting, as a result of friction between the bodywork or the pane and the material of the profiled bead.

It is also preferable to exclude the possibility of the sealing ribs 6, 7 projecting past the external surface of the bodywork in the fitted state, or bearing in some way on the external face of the pane. This is relatively easy to achieve by correctly dimensioning the length and cross section of the lip. The shape and the arrangement of the point of flexion 10 between two relatively thick cross sections also prevents the lip 5 from being overstretched during fitting of the window.

Finally, supplementary measures are taken to ensure that the sealing ribs 6, 7 cannot be pushed back inadvertently (for example, when washing the vehicle) from the outside into the space 15. To do so, supplementary support lip or other suitable profiled component can be formed on the bulge of material 8 or on the lip 5. Such components can be located, in the fitted position, in the covered space of space 15 and bear on the bottom of the space 15, for example in the groove between the ledge 13 and the mounting flange 12.

However, they must not affect the mobility of the lip 5 or of the continuation 5'.

The detailed description which has just been given concerns more particularly a window equipped, by extrusion, with a profiled bead adhering to a main surface.

The same teachings apply to profiles obtained by other techniques (encapsulation or adhesive bonding) and/or covering more than one face of the pane.

What is claimed is:

1. A window for fitting into a bodywork opening of a vehicle,
    said bodywork opening of the vehicle having a ledge (13);
    said window comprising a pane (1) having a main surface (16), which faces inward towards the external surface of the bodywork (14) when the window is fitted in the bodywork opening, and an edge (21);
    wherein a profiled bead (2) is fixed at least in part on the main surface (16) of the pane, said profiled bead (2) comprising a base profile (3) projecting over the main surface (16) of the pane (1) and a lip (5) projecting from the base profile (3) beyond the edge (21) of the pane (1) wherein the lip (5) comprises a flexible continuation (5') ending in a first sealing rib (6) and a second sealing rib (7) that are connected by a bulge of material (8); and
    wherein the first sealing rib (6) contacts ledge (13) of the bodywork opening and the second sealing rib (7) contacts the edge (21) of the pane when the window is fitted in the bodywork opening of the vehicle.

2. The window of claim 1, wherein the profiled bead (2) is formed in such a way that the second sealing rib (7) is applied against the edge of the window (21) after the profiled bead (2) has been fixed on the pane (1) and the first sealing rib (6) is oriented in the opposite direction to the edge.

3. The window of claim 1, wherein the lip (5) has a point of flexion (10) of reduced cross section between the base profile (3) and the first and second sealing ribs (6, 7) when the profiled bead is fixed.

4. The window according to claim 1, wherein the external sealing rib (6) is located on the free end of a flexible continuation (5') that is elastically joined to the lip (5).

5. The window of claim 1, wherein the bulge of material (8) has an essentially triangular cross section.

6. The window of claim 1, wherein the first and second sealing ribs (6, 7) are connected to one another on the side oriented away from the lip (5), via a flat or only slightly curved face (9).

7. The window of claim 1, further comprising a profiled component formed on the bulge of material (8) or on the lip (5), wherein the lip has an elastic flexion capacity and the profiled component bears on the bottom of the gap (15) between the groove between the ledge (13) and the mounting flange (12).

8. A window for fitting into a bodywork opening of a vehicle,
    said bodywork opening of the vehicle having a ledge (13);
    said window comprising a pane (1) having a main surface (16), which faces inward towards the external surface of the bodywork (14) when the window is fitted in the bodywork opening, and an edge (21);
    wherein a profiled bead (2) is secured to at least part of the main surface (16) of the pane, said profiled bead (2) comprising a base profile (3) projecting over the main surface (16) of the pane (1) and a lip (5) projecting from the base profile (3) beyond the edge (21) of the pane (1) wherein the lip (5) comprises a flexible continuation (5') ending in a first sealing rib (6) and a second sealing rib (7) that are connected by a bulge of material (8); and
    wherein the first sealing rib (6) contacts ledge (13) of the bodywork opening and the second sealing rib (7) contacts the edge (21) of the pane when the window is fitted in the bodywork opening of the vehicle.

9. The window of claim 8, wherein the main surface (16) of the pane (1) comprises a coating (1') and the profile bead (2) contacts the coating (1').

10. The window of claim 9, wherein the coating (1') is opaque.

11. The window of claim 9, further comprising a strip of adhesive (1") disposed between the bodywork opening (11) and the pane (1).

12. A window for fitting into a bodywork opening of a vehicle bodywork, comprising:
    said bodywork opening of the vehicle having a ledge (13);
    (1) having a main surface (16) that faces inwardly towards an external surface of the bodywork (14) when the pane is fitted in the bodywork opening, and an edge (21); and
    a profiled bead (2) comprising a base profile (3) extending over the main surface (16) of the pane from proximate the main surface to form a support rib abutting the external surface of the bodywork (14), and a lip (5) projecting from the base profile (3) beyond the edge (21) of tha pane (1);
    wherein the lip (5) comprises a flexible continuation (5') ending in a first sealing rib (6) and a second sealing rib (7) that are connected together; and
    wherein the first sealing rib (6) contacts ledge (13) of the bodywork opening and the second sealing rib (7) contacts the edge (21) of the pane when the window is fitted in the bodywork opening of the vehicle.

13. The window of claim 12, further comprising a strip of adhesive (1") disposed between the bodywork opening (11) and the pane (1).

* * * * *